United States Patent
Otsuka

(10) Patent No.: US 10,065,656 B2
(45) Date of Patent: Sep. 4, 2018

(54) AUTONOMOUS DRIVING DEVICE AND VEHICLE CONTROL DEVICE

(71) Applicant: TOYOTA JIDOSHA KABUSHIKI KAISHA, Toyota-shi, Aichi-ken (JP)

(72) Inventor: Kohei Otsuka, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/179,127

(22) Filed: Jun. 10, 2016

(65) Prior Publication Data

US 2016/0362116 A1    Dec. 15, 2016

(30) Foreign Application Priority Data

Jun. 15, 2015   (JP) .................. 2015-119981

(51) Int. Cl.
| G05D 1/00 | (2006.01) |
| B60W 50/08 | (2012.01) |
| B60W 50/00 | (2006.01) |

(52) U.S. Cl.
CPC ...... B60W 50/082 (2013.01); B60W 50/0098 (2013.01); G05D 1/0061 (2013.01);
(Continued)

(58) Field of Classification Search
CPC ............... G05D 1/0061; G05D 1/0088; G05D 2201/0213; B60W 50/082; B60W 50/0098; B60W 2050/0095; Y02T 10/7258
(Continued)

(56) References Cited

U.S. PATENT DOCUMENTS

| 5,469,356 A | 11/1995 | Hawkins et al. |
| 5,684,696 A | 11/1997 | Rao et al. |

(Continued)

FOREIGN PATENT DOCUMENTS

| DE | 102010001581 A1 | 8/2011 |
| EP | 1275573 A2 | 1/2003 |

(Continued)

OTHER PUBLICATIONS

Communication dated Aug. 11, 2017, issued by the U.S. Patent and Trademark Office issued to U.S. Appl. No. 15/077,001.
(Continued)

*Primary Examiner* — Nga X Nguyen
(74) *Attorney, Agent, or Firm* — Sughrue Mion, PLLC

(57) ABSTRACT

If the difference of the manual driving operation amount, detected by a manual driving operation amount detection portion, from the autonomous driving operation amount, calculated by an autonomous driving operation amount calculation portion, is equal to or smaller than an operation amount threshold during manual driving, a driving state switching portion switches the driving state from manual driving to autonomous driving in response to an autonomous driving switching request from a host vehicle's driver. This configuration prevents the switching from manual driving to autonomous driving if the driver's manual driving operation differs much from the autonomous driving operation with a high possibility that the autonomous driving operation suitable for the actual traveling environment will not be performed. Therefore, this configuration prevents the switching from manual driving to autonomous driving if the possibility is high that the autonomous driving operation suitable for the actual traveling environment will not be performed.

7 Claims, 8 Drawing Sheets

(52) U.S. Cl.
CPC ... *G05D 1/0088* (2013.01); *B60W 2050/0095* (2013.01); *G05D 2201/0213* (2013.01); *Y02T 10/7258* (2013.01)

(58) Field of Classification Search
USPC ............ 701/23–26, 36–38, 52–56, 300–302
See application file for complete search history.

(56) References Cited

U.S. PATENT DOCUMENTS

| | | | |
|---|---|---|---|
| 5,774,069 | A | 6/1998 | Tanaka et al. |
| 5,906,645 | A | 5/1999 | Kagawa et al. |
| 8,670,891 | B1 | 3/2014 | Szybalski et al. |
| 9,342,074 | B2 | 5/2016 | Dolgov et al. |
| 9,365,218 | B2 | 6/2016 | Pallett et al. |
| 9,612,596 | B2 | 4/2017 | Zwicky et al. |
| 9,637,120 | B2 | 5/2017 | Laur et al. |
| 9,684,306 | B2 | 6/2017 | Sprigg |
| 9,703,289 | B2 | 7/2017 | Sato et al. |
| 2007/0198145 | A1 | 8/2007 | Norris et al. |
| 2010/0179715 | A1 | 7/2010 | Puddy |
| 2010/0286847 | A1 | 11/2010 | Cerchie et al. |
| 2011/0077028 | A1 | 3/2011 | Wilkes, III et al. |
| 2012/0046817 | A1 | 2/2012 | Kindo et al. |
| 2014/0156133 | A1* | 6/2014 | Cullinane ............ B60W 30/00 701/23 |
| 2014/0303827 | A1 | 10/2014 | Dolgov et al. |
| 2015/0346724 | A1 | 12/2015 | Jones et al. |
| 2016/0194003 | A1 | 7/2016 | Torii et al. |
| 2016/0280236 | A1 | 9/2016 | Otsuka |
| 2016/0362116 | A1 | 12/2016 | Otsuka |
| 2017/0003683 | A1 | 1/2017 | Sato et al. |

FOREIGN PATENT DOCUMENTS

| | | |
|---|---|---|
| JP | 6-298108 A | 10/1994 |
| JP | 2002230682 A | 8/2002 |
| JP | 2007-196809 A | 8/2007 |
| JP | 2012-017717 A | 1/2012 |

OTHER PUBLICATIONS

Communication dated Jan. 22, 2018 from the United States Patent and Trademark Office in U.S. Appl. No. 15/077,001.
Notice of Allowance dated Nov. 29, 2017 from U.S. Patent & Trademark Office in U.S. Appl. No. 15/077,001.

* cited by examiner

AUTONOMOUS DRIVING DEVICE AND VEHICLE CONTROL DEVICE

INCORPORATION BY REFERENCE

The disclosure of Japanese Patent Application No. 2015-119981 filed on Jun. 15, 2015 including the specification, drawings and abstract is incorporated herein by reference in its entirety.

BACKGROUND OF THE INVENTION

1. Field of the Invention

The present invention relates to an autonomous driving device and a vehicle control device.

2. Description of Related Art

An autonomous driving device that can switch the host vehicle's driving state from manual driving to autonomous driving is proposed. For example, the autonomous driving device disclosed in DE 102010001581 A recognizes the current traveling environment using sensors, estimates the future traveling environment based on the detected current traveling environment, and determines whether the host vehicle traveling state may be switched from manual driving to autonomous driving based on the estimated future traveling environment.

An autonomous driving device, such as the one described above, performs autonomous driving based on the host vehicle traveling environment recognized by the sensors. This means that, if the sensor-recognized traveling environment (such as the host vehicle position or the lane in which the host vehicle is traveling) differs from the actual traveling environment, there is a possibility that the autonomous driving operation suitable for the actual traveling environment will not be performed when the host vehicle driving state is switched from manual driving to autonomous driving.

SUMMARY OF THE INVENTION

In view of the foregoing, the present invention provides an autonomous driving device that can prevent the driving state from being switched from manual driving to autonomous driving if there is a possibility that the autonomous driving operation suitable for the actual traveling environment will not be performed.

A first aspect of the present invention relates to an autonomous driving device configured to switch a driving state of a host vehicle from manual driving to autonomous driving. The autonomous driving device includes a manual driving operation amount detection portion configured to detect, during the manual driving, a manual driving operation amount of a manual driving operation performed by a driver of the host vehicle; an autonomous driving operation amount calculation portion configured to calculate, during the manual driving, an autonomous driving operation amount of an autonomously-controlled autonomous driving operation based on a traveling environment of the host vehicle assuming that the driving state is switched from the manual driving to the autonomous driving; and a driving state switching portion configured to switche, during the manual driving, the driving state from the manual driving to the autonomous driving in response to a request to switch to the autonomous driving entered by the driver of the host vehicle if a difference of the manual driving operation amount from the autonomous driving operation amount is equal to or smaller than an operation amount threshold.

According to this configuration, if the difference of the manual driving operation amount, detected by the manual driving operation amount detection portion, from the autonomous driving operation amount, calculated by the autonomous driving operation amount calculation portion, is equal to or smaller than the operation amount threshold, the driving state switching portion switches, during the manual driving, the driving state from manual driving to autonomous driving in response to a request to switch to autonomous driving entered by the driver of the host vehicle. Therefore, if the manual driving operation performed by the driver of the host vehicle differs much from the autonomous driving operation with a high possibility that the autonomous driving operation suitable for the actual traveling environment will not be performed, the autonomous driving device can prevent the driving state from being switched from manual driving to autonomous driving. Therefore, the autonomous driving device can prevent the driving state from being switched from manual driving to autonomous driving if the possibility is high that the autonomous driving operation suitable for the actual traveling environment will not be performed.

In the first aspect described above, the manual driving operation amount detection portion may detect the manual driving operation amount of each of a steering operation and an acceleration/deceleration operation performed via the manual driving operation during the manual driving in which the steering operation and the acceleration/deceleration operation of the host vehicle are performed via the manual driving operation by the driver of the host vehicle, the autonomous driving operation amount calculation portion may calculate the autonomous driving operation amount of each of the steering operation and the acceleration/deceleration operation performed via the autonomous driving operation assuming that each of the steering operation and the acceleration/deceleration operation performed via the manual driving operation is switched to the autonomously-controlled autonomous driving operation, and the driving state switching portion may switch the steering operation to the autonomously-controlled autonomous driving operation in response to the switching request if a difference of the manual driving operation amount of the steering operation performed via the manual driving operation from the autonomous driving operation amount of the steering operation performed via the autonomous driving operation is equal to or smaller than the operation amount threshold that is set for the steering operation, and switches the acceleration/deceleration operation to the autonomously-controlled autonomous driving operation in response to the switching request if a difference of the manual driving operation amount of the acceleration/deceleration operation performed via the manual driving operation from the autonomous driving operation amount of the acceleration/deceleration operation performed via the autonomous driving operation is equal to or smaller than the operation amount threshold that is set for the acceleration/deceleration operation.

According to this configuration, while the steering operation and the acceleration/deceleration operation of the host vehicle are performed via the manual driving operation by the driver of the host vehicle, the driving state switching portion switches the driving state as follows. That is, if the difference of the manual driving operation amount of the steering operation performed via the manual driving operation from the autonomous driving operation amount of the steering operation performed via the autonomous driving operation is equal to or smaller than the operation amount threshold that is set for the steering operation, the driving state switching portion switches the steering operation to the autonomously-controlled autonomous driving operation in response to a switching request. In addition, if the difference of the manual driving operation amount of the acceleration/deceleration operation performed via the manual driving operation from the autonomous driving operation amount of the acceleration/deceleration operation performed via the autonomous driving operation is equal to or smaller than the operation amount threshold that is set for the acceleration/deceleration operation, the driving state switching portion switches the acceleration/deceleration operation to the autonomously-controlled autonomous driving operation in response to a switching request. Therefore, for each of the steering operation and the acceleration/deceleration operation, if the manual driving operation differs much from the autonomous driving operation with a high possibility that the autonomous driving operation suitable for the actual traveling environment will not be performed, the autonomous driving device can prevent the driving state from being switched from manual driving to autonomous driving. On the other hand, if the manual driving operation differs less from the autonomous driving operation with a high possibility that the autonomous driving operation suitable for the actual traveling environment will be performed, the autonomous driving device can switch the driving state from manual driving to autonomous driving.

A second aspect of the present invention relates to a vehicle control device that can control a driving state of a vehicle by switching the driving state from manual driving to autonomous driving. The vehicle control device includes an external sensor that detects an external situation of the vehicle; an internal sensor that detects information indicating a traveling state of the vehicle and a manual driving operation amount performed by a driver; an actuator that performs traveling control of the vehicle; and an ECU that controls the actuator during the manual driving by calculating a control amount of the autonomously-controlled actuator based on the external situation assuming that the driving state is switched from the manual driving to the autonomous driving and, if a difference between the manual driving operation amount and the control amount is equal to or smaller than a predetermined threshold, by switching the driving state from the manual driving to the autonomous driving in response to a request to switch to the autonomous driving.

According to one aspect of the present invention, switching from manual driving to autonomous driving can be prevented if there is a possibility that the autonomous driving operation suitable for the actual traveling environment will not be performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
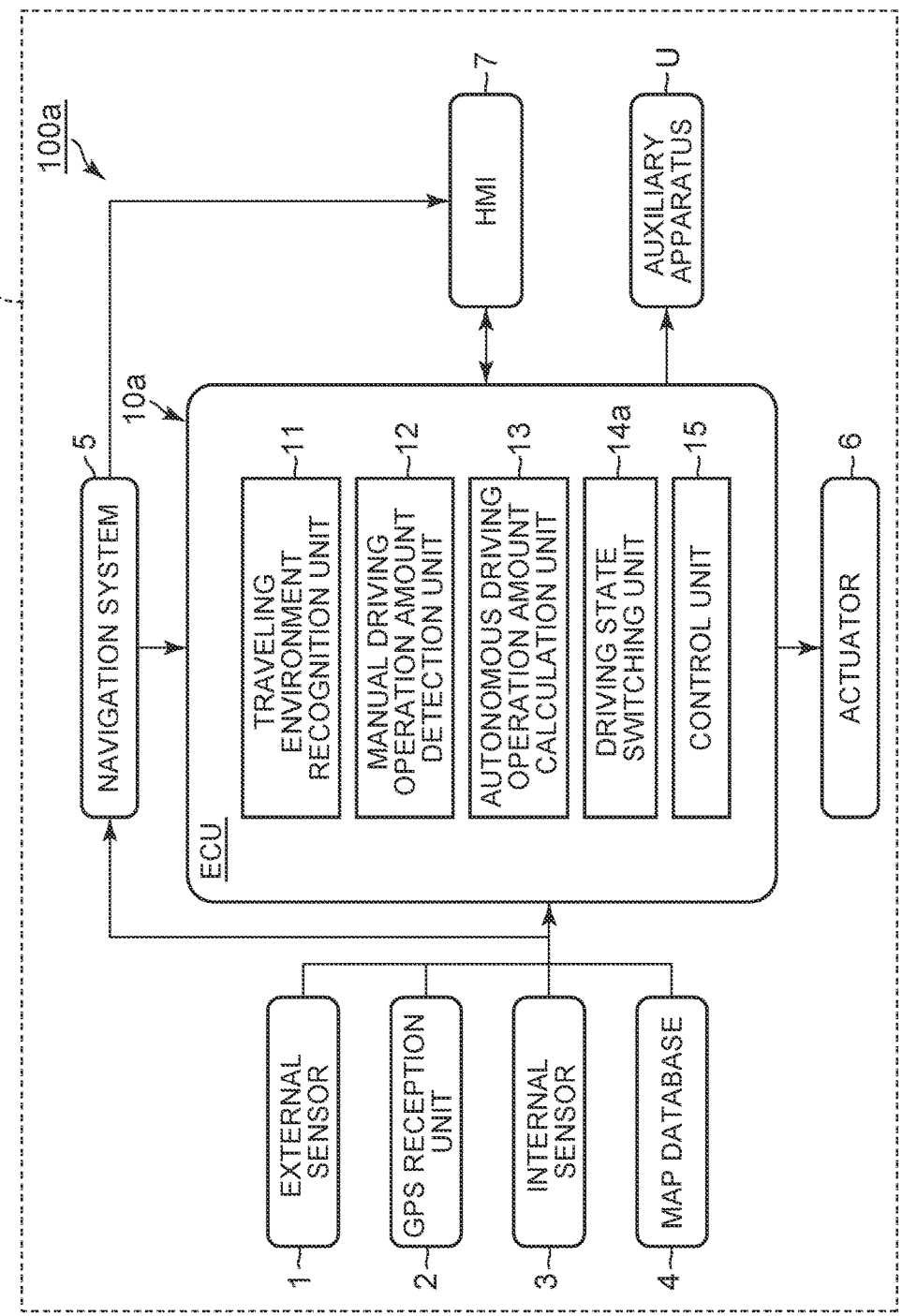
FIG. 1 is a block diagram showing the configuration of an autonomous driving device in a first embodiment.

[First embodiment] A first embodiment of the present invention is described in detail below with reference to the drawings. As shown in FIG. 1, an autonomous driving device 100a in the first embodiment is mounted on a host vehicle V such as a passenger car. The autonomous driving device 100a can switch the driving state of the host vehicle V from manual driving to autonomous driving in response to an autonomous driving switching request from the driver of the host vehicle V. When the autonomous driving possibility determination mode is active, the autonomous driving device 100a determines whether the driving state can be switched from manual driving to autonomous driving. If it is determined that the driving state can be switched to autonomous driving, the autonomous driving device 100a switches the driving state to autonomous driving in response to an autonomous driving switching request from the driver of the host vehicle V. During autonomous driving, the autonomous driving device 100a controls the autonomous driving of the host vehicle V.

Autonomous driving means that the driving operation of the host vehicle V, such as the steering operation and the acceleration/deceleration operation, is controlled not by the manual driving operation of the driver of the host vehicle V. Autonomous driving includes the driving state in which only one of the steering operation and the acceleration/deceleration operation of the host vehicle V is performed by the autonomously-controlled autonomous driving operation and the other of the steering operation and the acceleration/deceleration operation of the host vehicle V is performed by the manual driving operation of the driver of the host vehicle V. In addition, manual driving includes the driving state in which only one of the steering operation and the acceleration/deceleration operation of the host vehicle V is performed by the manual driving operation of the driver of the host vehicle V and the other of the steering operation and the acceleration/deceleration operation of the host vehicle V is performed by the autonomously-controlled autonomous driving operation.

As shown in FIG. 1, the autonomous driving device 100a includes an external sensor 1, a Global Positioning System (GPS) reception unit 2, an internal sensor 3, a map database 4, a navigation system 5, an actuator 6, a Human Machine Interface (HMI) 7, an auxiliary apparatus U, and an ECU 10a.

The external sensor 1 is a detection apparatus for detecting the external situation that is the surrounding information on the host vehicle V. The external sensor 1 includes at least one of a camera, a radar, and a Laser Imaging Detection and Ranging (LIDAR).

The camera is a capturing apparatus that captures the external situation of the host vehicle V. The camera is provided, for example, on the interior side of the windshield of the host vehicle V. The camera may be a monocular camera or a stereo camera. The stereo camera includes two capturing units arranged so that the disparity between the right eye and the left eye can be reproduced. The information captured by the stereo camera also includes the depth direction information. The camera outputs the captured information on the external situation of the host vehicle V to the ECU 10a.

The radar detects an obstacle outside the host vehicle V using a radio wave. For example, the radio wave is a millimeter wave. The radar detects an obstacle by sending a radio wave to the surroundings of the host vehicle V and by receiving the radio wave reflected by an obstacle. The radar can output the distance to, or the direction of, an obstacle as the obstacle information on the obstacle. The radar outputs the detected obstacle information to the ECU 10a. When sensor fusion is performed, the reception information on the reflected radio wave may be output to the ECU 10a.

The LIDAR detects an obstacle outside the host vehicle V using light. The LIDAR measures the distance to a reflection point and detects an obstacle by sending light to the surroundings of the host vehicle V and by receiving light reflected by the obstacle. The LIDAR can output the distance to, or the direction of, an obstacle as the obstacle information. The LIDAR outputs the detected obstacle information to the ECU 10a. When sensor fusion is performed, the reception information on the reflected light may be output to the ECU 10a. Two or more of the camera, LIDAR, and radar need not necessarily be installed.

The GPS reception unit 2 receives signals from three or more GPS satellites to acquire the position information indicating the position of the host vehicle V. The position information includes the longitude and the latitude. The GPS reception unit 2 outputs the measured position information on the host vehicle V to the ECU 10a. Instead of the GPS reception unit 2, another unit capable of identifying the longitude and latitude of the position of the host vehicle V may be used.

The internal sensor 3 is a detection apparatus that detects the information according to the traveling state of the host vehicle V and the manual driving operation amount of the manual driving operation performed by the driver of the host vehicle V. The manual driving operation includes the steering operation and the acceleration/deceleration operation performed by the driver of the host vehicle V. The internal sensor 3 includes at least a vehicle speed sensor, an acceleration sensor, and a yaw rate sensor for detecting the information according to the traveling state of the host vehicle V. In addition, the internal sensor 3 includes at least a steering sensor, an accelerator pedal sensor, and a brake pedal sensor for detecting the operation amount.

The vehicle speed sensor is a detection apparatus that detects the speed of the host vehicle V. For example, a wheel speed sensor is used as the vehicle speed sensor. The wheel speed sensor is provided on the wheels of the host vehicle V or on a component such as the drive shaft, which rotates in synchronization with the wheels, to detect the rotation speed of the wheels. The vehicle speed sensor outputs the vehicle speed information (wheel speed information), which includes the speed of the host vehicle V, to the ECU 10a.

The acceleration sensor is a detection apparatus that detects the acceleration of the host vehicle V. For example, the acceleration sensor includes a longitudinal acceleration sensor that detects acceleration in the longitudinal direction of the host vehicle V and a lateral acceleration sensor that detects the lateral acceleration of the host vehicle V. The acceleration sensor outputs the acceleration information, which includes the acceleration of host vehicle V, to the ECU 10a.

The yaw rate sensor is a detection apparatus that detects the yaw rate (turning angle velocity) around the vertical axis at the center of gravity of the host vehicle V. For example, a gyro sensor is used as the yaw rate sensor. The yaw rate sensor outputs the yaw rate information, which includes the yaw rate of the host vehicle V, to the ECU 10a.

The steering sensor is a detection apparatus that detects the operation amount of the steering operation on the steering wheel performed by the driver of the host vehicle. The operation amount detected by the steering sensor is, for example, the steering angle of the steering wheel or the steering torque applied to the steering wheel. The steering sensor is provided, for example, on the steering shaft of the host vehicle V. The steering sensor outputs the information, which includes the steering angle of the steering wheel or the steering torque applied to the steering wheel, to the ECU 10a.

The accelerator pedal sensor is a detection apparatus that detects the accelerator pedal depression amount. The accelerator pedal depression amount is the accelerator pedal position (pedal position) in relation to the predetermined position. The predetermined position may be a fixed position or a position that is changed according to the predetermined parameter. The accelerator pedal sensor is provided, for example, on the shaft of the accelerator pedal of the host vehicle V. The accelerator pedal sensor outputs the operation information, according to the accelerator pedal depression amount, to the ECU 10a.

The brake pedal sensor is a detection apparatus that detects the brake pedal depression amount. The brake pedal depression amount is the brake pedal position (pedal position) in relation to the predetermined position. The predetermined position may be a fixed position or a position that is changed according to the predetermined parameter. The brake pedal sensor is provided, for example, on a part of the brake pedal. The brake pedal sensor may detect the brake pedal operation force (the force on the brake pedal or the pressure of the master cylinder, etc.). The brake pedal sensor outputs the operation information, generated according to the brake pedal depression amount or the operation force, to the ECU 10a.

The map database 4 is a database that stores map information. For example, the map database 4 is formed in a hard disk drive (HDD) mounted on the host vehicle V. The map information includes the position information on roads, the information on road shapes, and the position information on intersections and junctions. The information on a road shape includes the information on whether the road is a curved road or a straight road, the curvature of a curved road, and so on. In addition, when the autonomous driving device 100a uses the position information on shielding structures, such as a building or a wall, or the Simultaneous Localization and Mapping (SLAM) technology, the map information may include the output signal of the external sensor 1. The map information may also include the autonomous driving map area information or the autonomous driving map section information in which the information, necessary for the host vehicle V to perform autonomous driving such as the information on road shapes, is included in advance. The map database 4 may also be stored in a computer in facilities, such as an information processing center, that can communicate with the host vehicle V.

The navigation system 5 is a device that guides the driver of the host vehicle V to the destination that is set on the map by the driver of the host vehicle V. The navigation system 5 calculates a route, along which the host vehicle V will travel, based on the position information on the host vehicle V measured by the GPS reception unit 2 and the map information stored in the map database 4. The route may be a route that identifies a traveling lane, in which the host vehicle V will travel, in a multiple-lane area. The navigation system 5 calculates a desired route, from the position of the host vehicle V to the destination, and informs the driver about the calculated desired route through display on the display device or through voice output from the speaker. The navigation system 5 outputs the information on the desired route of the host vehicle V to the ECU 10*a*. The navigation system 5 may use the information stored in a computer in facilities, such as an information processing center, that can communicate with the host vehicle V. A part of the processing to be performed by the navigation system 5 may also be performed by the computer in the facilities.

The actuator 6 is a device that performs the traveling control of the host vehicle V. The actuator 6 includes at least a throttle actuator, a brake actuator, and a steering actuator. The throttle actuator controls the amount of air to be supplied to the engine (throttle angle) according to the control signal from the ECU 10*a* to control the driving force of the host vehicle V. When the host vehicle V is a hybrid vehicle or an electric vehicle, the actuator 6 does not include a throttle actuator and, in this case, the control signal is input from the ECU 10*a* to the motor, which is the source of power, to control the driving force.

The brake actuator controls the brake system according to the control signal, received from the ECU 10*a*, to control the controlling force to be applied to the wheels of the host vehicle V. As the brake system, a hydraulic brake system may be used. The steering actuator controls the driving of the assist motor, one component of the electric power steering system for controlling the steering torque, according to the control signal received from the ECU 10*a*. By doing so, the steering actuator controls the steering torque of the host vehicle V.

The HMI 7 is an interface for outputting and inputting information between the occupants (including the driver) of the host vehicle V and the autonomous driving device 100*a*. The HMI 7 has a display panel for displaying image information to the occupants, a speaker for outputting voices, operation buttons or a touch panel for allowing the occupants to perform input operations, and a microphone for inputting voices. During manual driving, the HMI 7 receives a request to switch to autonomous driving from the driver of the host vehicle V. During manual driving, the HMI 7 may also receive a request to start the autonomous driving possibility determination mode from the driver of the host vehicle V. A request to switch to autonomous driving and a request to start the autonomous driving possibility determination mode may be input via an input operation on the operation buttons or the touch panel or via a voice input to the microphone. The HMI 7 may output information to the occupants using a wirelessly connected mobile information terminal or may receive an input operation from the occupants using a mobile information terminal.

The auxiliary apparatus U is an apparatus that can be operated usually by the driver of the host vehicle V. The auxiliary apparatus U is a generic term for the apparatuses not included in the actuator 6. The auxiliary apparatus U in the autonomous driving device 100*a* includes direction indicator lights, headlights, wipers, and so on.

The ECU 10*a* controls the autonomous driving of the host vehicle V. The ECU 10*a* is an electronic control unit that includes a Central Processing Unit (CPU), a Read Only Memory (ROM), a Random Access Memory (RAM). The ECU 10*a* has a traveling environment recognition unit 11, a manual driving operation amount detection unit 12, an autonomous driving operation amount calculation unit 13, a driving state switching unit 14*a*, and a control unit 15. The ECU 10*a* loads a program, stored in the ROM, into the RAM for execution in the CPU to control various parts of the above-described components such as the traveling environment recognition unit 11. The ECU 10*a* may be configured by a plurality of electronic control units.

The traveling environment recognition unit 11 recognizes the traveling environment around the host vehicle V based on the information acquired by the external sensor 1, GPS reception unit 2, and map database 4. Based on the information acquired by the external sensor 1, the traveling environment recognition unit 11 acquires the information on stationary objects, such as the lane boundaries (white line, yellow line) on a road, curbs, guardrails, poles, medians, buildings, and trees, and moving objects such as pedestrians, other vehicles, motorcycles, and bicycles. Based on the information acquired by the GPS reception unit 2 and the map database 4, the traveling environment recognition unit 11 acquires the information on the position of the host vehicle V, the information on the lane in which the host vehicle V is traveling, and the information on the shape, curvature, slope, unevenness, number of lanes, presence of branches, and the presence of merging of the road on which the host vehicle V is traveling.

The manual driving operation amount detection unit 12 detects, during manual driving, the manual driving operation amount of each of the steering operation and the acceleration/deceleration operation, which are performed via the manual driving operation by the driver of the host vehicle V, based on the information acquired by the internal sensor 3. The manual driving operation amount of the steering operation is, for example, the steering angle of the front wheels of the host vehicle V corresponding to the steering angle of the steering wheel or the steering torque applied to the steering wheel. The manual driving operation amount of the acceleration/deceleration operation is, for example, the throttle angle of the host vehicle V corresponding to the accelerator pedal depression amount and the brake force of the host vehicle V corresponding to the brake pedal depression amount and the brake pedal operation force.

The autonomous driving operation amount calculation unit 13 calculates, during manual driving, the autonomous driving operation amount of each of the steering operation and the acceleration/deceleration operation based on the traveling environment of the host vehicle V acquired by the traveling environment recognition unit 11. This operation amount is calculated assuming that the driving state is switched from manual driving to autonomous driving and, as a result, each of the steering operation and the acceleration/deceleration operation, which are performed via the manual driving operation, is switched to the autonomously controlled autonomous driving operation. The autonomous driving operation amount of the steering operation is, for example, the steering angle of the front wheels of the host vehicle V determined according to the traveling environment. The autonomous driving operation amount of the acceleration/deceleration operation is, for example, the throttle angle and the brake force of the host vehicle V determined based on the traveling environment.

The driving state switching unit 14*a* switches the driving state during manual driving from manual driving to autonomous driving in response to an autonomous driving switching request from the driver of the host vehicle if the difference of the manual driving operation amount from the autonomous driving operation amount is equal to or smaller than the operation amount threshold. The operation amount threshold refers to the threshold of the operation amount of the steering operation and the acceleration/deceleration operation that is set for determining whether the driving state of the host vehicle V is to be switched from manual driving to autonomous driving. The operation amount threshold of the steering operation is a value indicating the allowable difference between the steering angle of the front wheels of the host vehicle V indicated by the manual driving operation amount and the steering angle of the front wheels of the host vehicle V indicated by the autonomous driving operation amount. The operation amount threshold of the acceleration/deceleration operation is a value indicating the allowable difference between the throttle angle and the brake force of the host vehicle V indicated by the manual driving operation amount and the throttle angle and the brake force of the host vehicle V indicated by the autonomous driving operation amount.

The control unit 15 generates a travel plan of the host vehicle V when manual driving or autonomous driving is performed. A travel plan is generated based on the desired route calculated by the navigation system 5, the information on the traveling environment around the host vehicle V recognized by the traveling environment recognition unit 11, and the map information acquired from the map database 4. The travel plan is a trajectory along which the host vehicle V will move on the desired route. The travel plan includes the information on the speed, acceleration, deceleration, direction, and steering angle of the host vehicle V at each time of day. The control unit 15 generates the travel plan so that the host vehicle V travels on the desired route while satisfying the requirements for safety, compliance, and traveling efficiency. In addition, the control unit 15 generates the travel plan of the host vehicle V based on the traveling environment around the host vehicle V so that contact with an obstacle is avoided. The control unit 15 autonomously controls the traveling of the host vehicle V based on the generated travel plan. The control unit 15 outputs the control signal, generated according to the travel plan, to the actuator 6. In this manner, the control unit 15 controls the traveling of the host vehicle V so that the host vehicle V travels autonomously according to the travel plan.

Next, the processing performed by the autonomous driving device 100a is described. In the description below, it is assumed that the host vehicle V is traveling in the manual driving mode in which both the steering operation and the acceleration/deceleration operation are performed via the manual driving operation performed by the driver of the host vehicle V. In the description below, it is also assumed that the autonomous driving possibility determination mode of the autonomous driving device 100a is already active. The operation start condition of the autonomous driving possibility determination mode will be described later.

Figure 2:
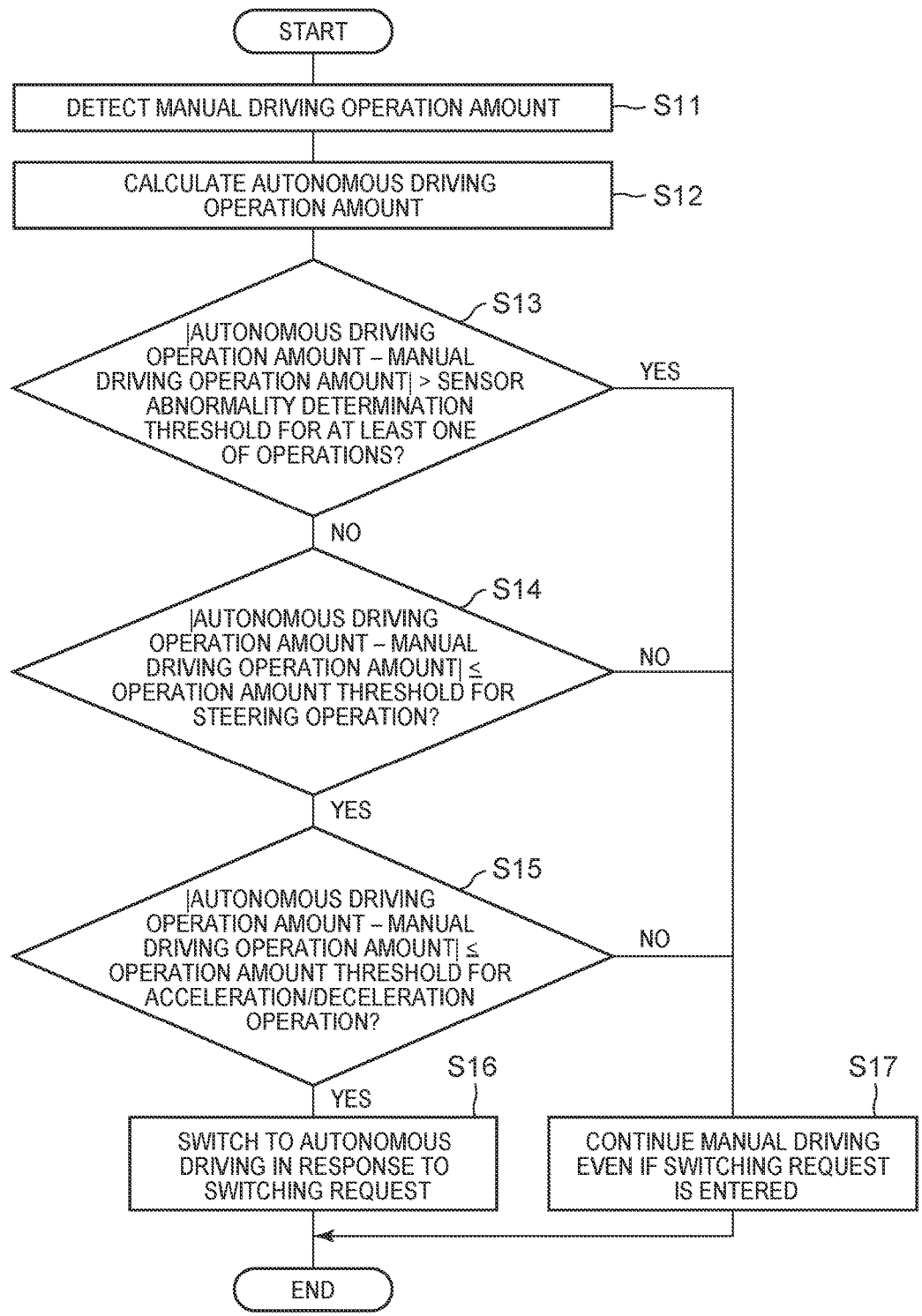
FIG. 2 is a flowchart showing the operation of the autonomous driving device shown in FIG. 1.

As shown in FIG. 2, the manual driving operation amount detection unit 12 of the ECU 10a detects the manual driving operation amount of each of the steering operation and the acceleration/deceleration operation, performed via the manual driving operation by the driver of the host vehicle V, based on the information acquired by the internal sensor 3 (S11). The autonomous driving operation amount calculation unit 13 of the ECU 10a calculates the autonomous driving operation amount of each of the steering operation and the acceleration/deceleration operation based on the traveling environment of the host vehicle V acquired by the traveling environment recognition unit 11 (S12). This operation amount is calculated assuming that the driving state is switched from manual driving to autonomous and, as a result, each of the steering operation and the acceleration/deceleration operation, performed via the manual driving operation, is switched to the autonomously-controlled autonomous driving operation.

The driving state switching unit 14a of the ECU 10a determines whether the difference of the manual driving operation amount of the manual driving operation from the autonomous driving operation amount of the autonomous driving operation is larger than the sensor abnormality determination threshold for at least one of the steering operation and the acceleration/deceleration operation (S13). The sensor abnormality determination threshold is set for each of the steering operation and the acceleration/deceleration operation. The sensor abnormality determination threshold is the operation amount threshold of the steering operation and the acceleration/deceleration operation that is set for determining whether an abnormality occurs in the external sensor 1 and/or the internal sensor 3. This sensor abnormality determination threshold is set to a value larger than the operation amount threshold described above. If the difference of the manual driving operation amount of the manual driving operation from the autonomous driving operation amount of the autonomous driving operation is not larger than the sensor abnormality determination threshold for both the steering operation and the acceleration/deceleration operation, the driving state switching unit 14a determines whether the difference of the manual driving operation amount of the steering operation performed via the manual driving operation from the autonomous driving operation amount of the steering operation performed via the autonomous driving operation is equal to or smaller than the operation amount threshold that is set for the steering operation (S14). If the difference of the manual driving operation amount from the autonomous driving operation amount is equal to or smaller than the operation amount threshold for the steering operation, the driving state switching unit 14a determines whether the difference of the manual driving operation amount of the acceleration/deceleration operation performed via the manual driving operation from the autonomous driving operation amount of the acceleration/deceleration operation performed via the autonomous driving operation is equal to or smaller than the operation amount threshold that is set for the acceleration/deceleration operation (S15).

Figure 3:
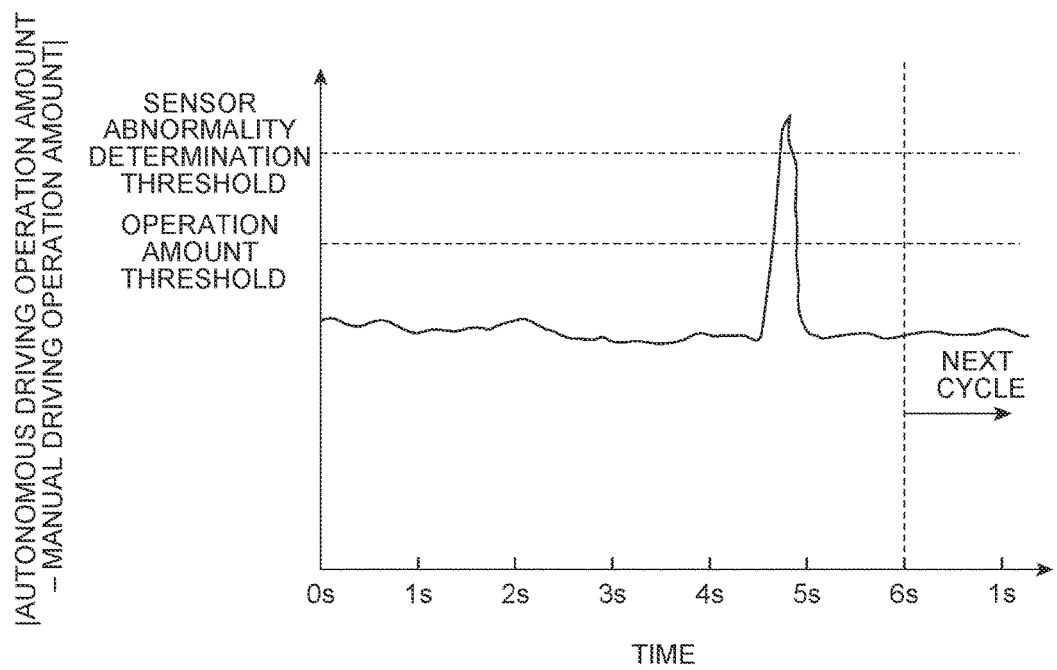
FIG. 3 is a graph that shows a difference between the manual driving operation amount and the autonomous driving operation amount that is determined on a cyclic basis.

If the state, in which the difference of the manual driving operation amount from the autonomous driving operation amount is equal to or smaller than the operation amount threshold, continues for a fixed time of several seconds to several minutes (for example, six seconds) for both the steering operation and the acceleration/deceleration operation, it may be determined that the difference of the manual driving operation amount from the autonomous driving operation amount is equal to or smaller than the operation amount threshold. On the other hand, if the state, in which the difference of the manual driving operation amount from the autonomous driving operation amount is equal to or smaller than the operation amount threshold, does not continue for the fixed time as shown in FIG. 3, it may be determined that the difference of the manual driving operation amount from the autonomous driving operation amount is larger than the operation amount threshold. In addition, if the average value or the integrated value of the differences of the manual driving operation amount from the autonomous driving operation amount is equal to or smaller than the operation amount threshold for a pre-set, fixed time (several seconds to several minutes) for both the steering operation and the acceleration/deceleration operation, it may be determined that the difference of the manual driving operation amount from the autonomous driving operation amount is equal to or smaller than the operation amount threshold. On the other hand, if the average value or the integrated value of the differences of the manual driving operation amount from the autonomous driving operation amount is larger than the operation amount threshold for the fixed time, it may be determined that the difference of the manual driving operation amount from the autonomous driving operation amount is larger than the operation amount threshold. In either case, if the difference of the manual driving operation amount from the autonomous driving operation amount is larger than the sensor abnormality determination threshold for at least one of the steering operation and the acceleration/deceleration operation for a fixed time of several seconds to several minutes (for example, six seconds) as shown in FIG. 3, it is considered that an abnormality occurs in the external sensor 1 and/or the internal sensor 3. In this case, even if the difference of the manual driving operation amount from the autonomous driving operation amount is equal to or smaller than the operation amount threshold, the driving state is not switched to autonomous driving.

For the acceleration/deceleration operation, if the manual driving operation amount is the operation amount of the acceleration operation and the autonomous driving operation amount is the operation amount of the deceleration operation or if the manual driving operation amount is the operation amount of the deceleration operation and the autonomous driving operation amount is the operation amount of the acceleration operation, it may be determined that the difference of the manual driving operation amount from the autonomous driving operation amount is larger than the operation amount threshold.

If the difference of the manual driving operation amount from the autonomous driving operation amount is equal to or smaller than the sensor abnormality determination threshold for both the steering operation and the acceleration/deceleration operation in step S13 and if the difference of the manual driving operation amount from the autonomous driving operation amount is equal to or smaller than the operation amount threshold for both the steering operation and the acceleration/deceleration operation in steps S14 and S15, the driving state switching unit 14a switches the driving state to the autonomously-controlled autonomous driving operation for both the steering operation and the acceleration/deceleration operation in response to an autonomous driving switching request entered by the driver of the host vehicle V via the HMI 7 (S16). On the other hand, if the difference of the manual driving operation amount from the autonomous driving operation amount is larger than the sensor abnormality determination threshold for at least one of the steering operation and the acceleration/deceleration operation in step S13 or if the difference of the manual driving operation amount from the autonomous driving operation amount is larger than the operation amount threshold for one of the steering operation and the acceleration/deceleration operation in steps S14 and S15, the driving state switching unit 14a continues manual driving even if the autonomous driving switching request is entered by the driver of the host vehicle V via the HMI 7 (S17).

Figure 4:
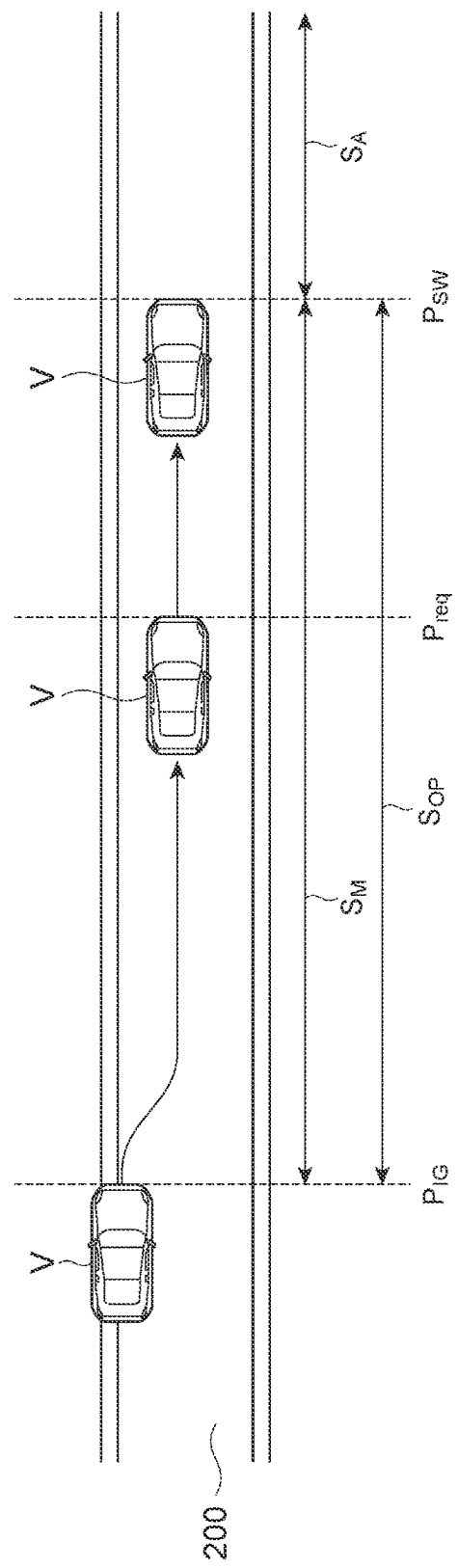
FIG. 4 is a diagram showing a situation in which the autonomous driving possibility determination mode of the autonomous driving device is started.

The following describes the operation start condition of the autonomous driving possibility determination mode in which the operation described above is performed. For example, as shown in FIG. 4, the operation section $S_{OP}$, where the autonomous driving possibility determination mode is active, is started on a road 200 at the engine start point $P_{IG}$ at which the engine of the host vehicle V is started by the manual driving operation. The manual driving section $S_M$, where the host vehicle V travels in manual driving mode, is started also at the engine start point $P_{IG}$. The autonomous driving device 100a repeatedly performs steps from S11 to S13 described above. At the switching request point $P_{req}$ in the manual driving section $S_M$ and the operation start section $S_{OP}$, the driver of the host vehicle V enters an autonomous driving switching request via the HMI 7. If the difference of the manual driving operation amount from the autonomous driving operation amount is equal to or smaller than the operation amount threshold for both the steering operation and the acceleration/deceleration operation in steps S14 and S15 described above, the autonomous driving device 100a notifies, via the HMI 7, the driver of the host vehicle V at the driving state switching point $P_{SW}$ that the driving state may be switched to autonomous driving and, after that, switches the driving state of the host vehicle V to autonomous driving. At the driving state switching point $P_{SW}$, the manual driving section $S_M$ and the operation section $S_{OP}$ are terminated, and the autonomous driving section $S_A$, where the host vehicle V travels in autonomous driving mode, is started.

Figure 5:
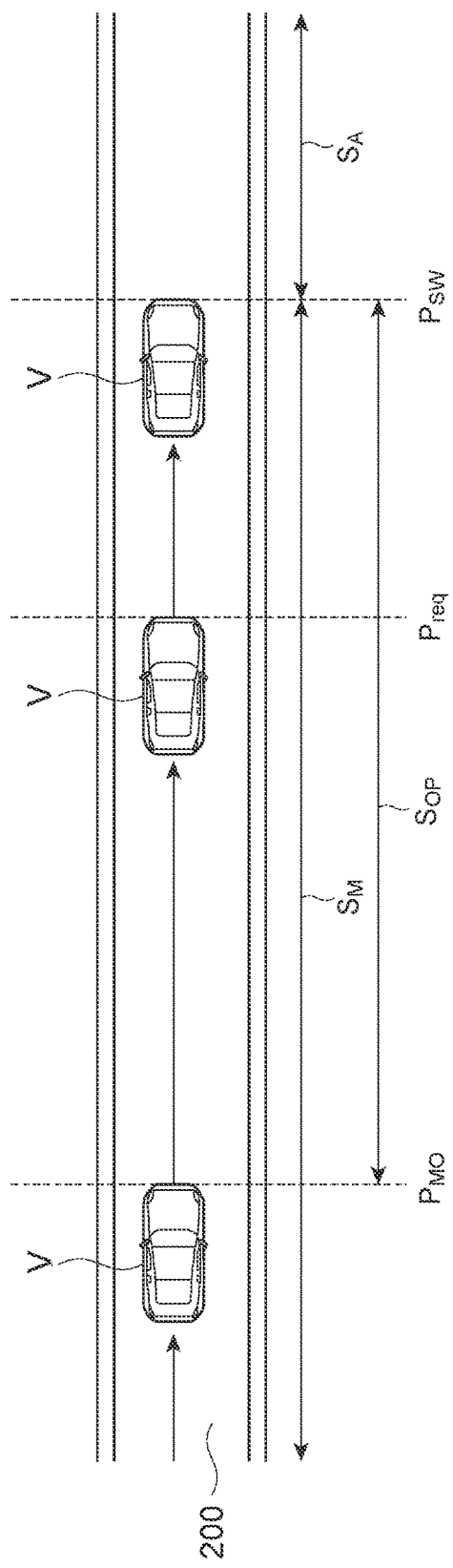
FIG. 5 is a diagram showing a situation in which the autonomous driving possibility determination mode of the autonomous driving device is started.

In addition, the operation section $S_{OP}$, where the autonomous driving possibility determination mode is active, may be started at the operation request point $P_{MO}$ as shown in FIG. 5. The operation request point $P_{MO}$ is a point which is included in the manual driving section $S_M$, where the host vehicle V travels in manual driving mode, and at which the driver of the host vehicle V enters an operation request for the autonomous driving possibility determination mode via the HMI 7. After that, the autonomous driving device 100a performs the same operation as in FIG. 4. It is also possible that the driver of the host vehicle V does not enter an operation request for the autonomous driving possibility determination mode at the operation request point $P_{MO}$ in FIG. 5 and that the operation section $S_{OP}$, where the autonomous driving possibility determination mode is active, is started at the switching request point $P_{req}$ at which the driver of the host vehicle V enters an autonomous driving switching request via the HMI 7 and, after that, the operation similar to that in FIG. 4 is performed.

Figure 6:
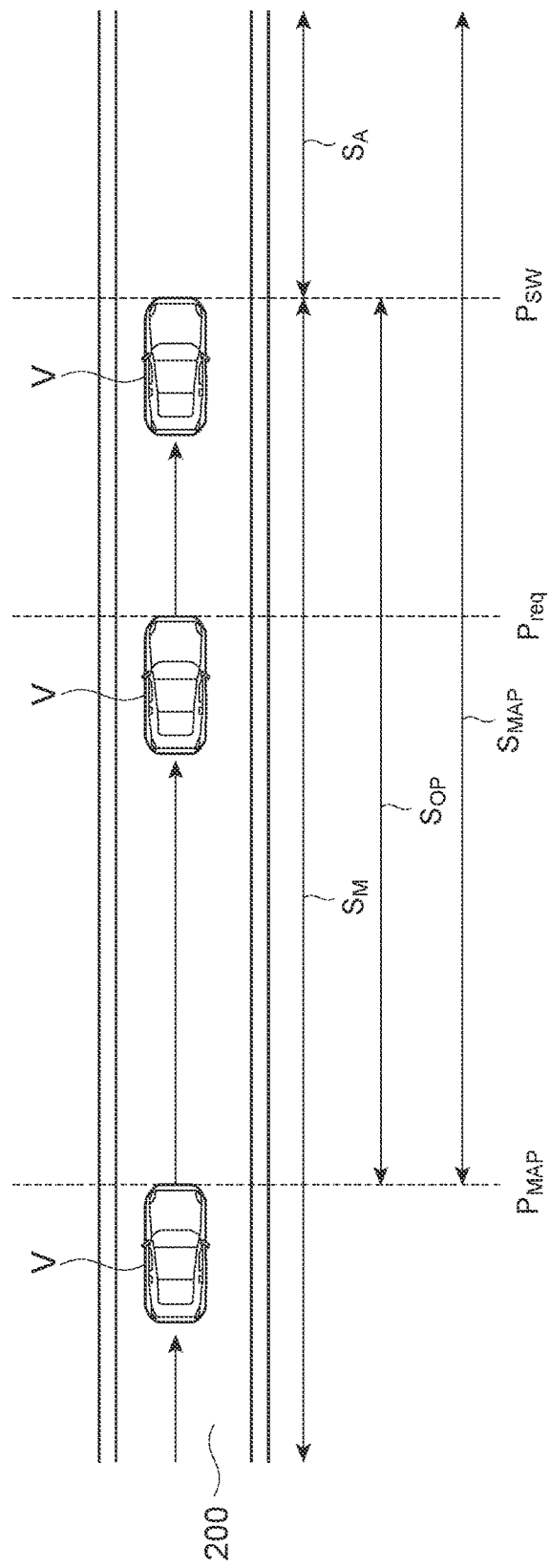
FIG. 6 is a diagram showing a situation in which the autonomous driving possibility determination mode is started.

In addition, the operation section $S_{OP}$, where the autonomous driving possibility determination mode is active, may be started at the map section start point $P_{MAP}$ as shown in FIG. 6. The map section start point $P_{MAP}$ is a point which is included in the manual driving section $S_M$, where the host vehicle V travels in manual driving mode, and at which the autonomous driving map section $S_{MAP}$ of the map information in the map database 4 is started. After that, the autonomous driving device 100a performs the same operation as that in FIG. 4. Under any condition described above in which the autonomous driving possibility determination mode is started, if the autonomous driving possibility determination mode is already active before the driver of the host vehicle V enters an autonomous driving switching request via the HMI 7, the autonomous driving device 100a may notify the driver of the host vehicle V that the driving state may be switched to autonomous driving before the driver of the host vehicle V enters an autonomous driving switching request and, after the switching request is entered, may switch the driving state to autonomous driving.

According to this embodiment, if the difference of the manual driving operation amount, detected by the manual driving operation amount detection unit 12, from the autonomous driving operation amount, calculated by the autonomous driving operation amount calculation unit 13, is equal to or smaller than operation amount threshold during manual driving, the driving state switching unit 14a switches the driving state from manual driving to autonomous driving in response to an autonomous driving switching request entered by the driver of the host vehicle V.

That is, the autonomous driving device 100a in this embodiment is based on the premise that the human's recognition ability to recognize the traveling environment, such as positions, and the judgement based on the recognition ability are more reliable than those of machines. For this reason, with priority on the manual driving operation amount via the human's manual driving operation, the autonomous driving device 100a in this embodiment compares the manual driving operation amount and the autonomous driving operation amount for a fixed time to determine whether the autonomous driving operation suitable for the actual traveling environment is possible.

Therefore, if the manual driving operation performed by the driver of the host vehicle V differs much from the autonomous driving operation with a high possibility that the autonomous driving operation suitable for the actual traveling environment will not be performed, the autonomous driving device 100a can prevent the driving state from being switched from manual driving to autonomous driving.

In this embodiment, if the steering operation of the host vehicle V is performed via the manual driving operation by the driver of the host vehicle V and if the acceleration/deceleration operation of the host vehicle V is performed via the autonomously-controlled autonomous driving operation, the manual driving operation amount detection unit 12 detects the manual driving operation amount of the steering operation performed via the manual driving operation and the autonomous driving operation amount calculation unit 13 calculates the autonomous driving operation amount of the steering operation assuming that the steering operation performed via the manual driving operation is switched to the autonomously-controlled autonomous driving operation. If the difference of the manual driving operation amount of the steering operation performed via the manual driving operation from the autonomous driving operation amount of the steering operation performed via the autonomous driving operation is equal to or smaller than the operation amount threshold that is set for the steering operation, the driving state switching unit 14a switches the steering operation to the autonomously-controlled autonomous driving operation in response to a switching request entered by the driver of the host vehicle V. The similar processing is performed for the acceleration/deceleration operation if the acceleration/deceleration operation of the host vehicle V is performed via the manual driving operation by the driver of the host vehicle V and if the steering operation of the host vehicle V is performed via the autonomously-controlled autonomous driving operation.

In this embodiment, if both the steering operation and the acceleration/deceleration operation of the host vehicle V are performed via the manual driving operation by the driver of the host vehicle V, the autonomous driving device 100a may perform the processing described above for only one of the steering operation and the acceleration/deceleration operation.

Figure 7:
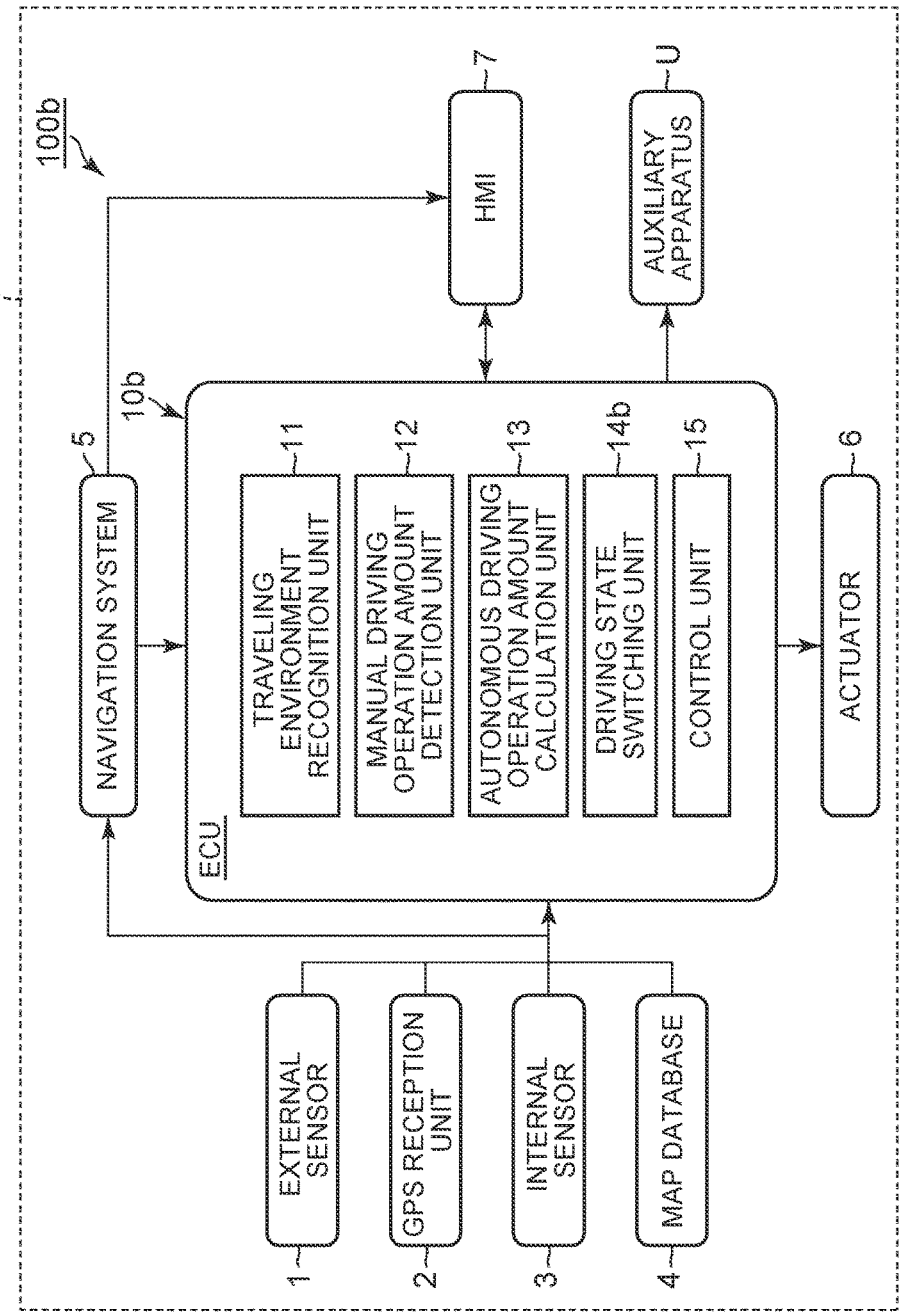
FIG. 7 is a block diagram showing the configuration of an autonomous driving device in a second embodiment.

[Second embodiment] A second embodiment of the present invention is described below. In this embodiment, the autonomous driving device determines whether the autonomous driving operation suitable for the actual traveling environment can be performed for each of the steering operation and the acceleration/deceleration operation. For the driving operation for which an autonomous driving operation suitable for the actual traveling environment is likely to be performed, the autonomous driving device switches the driving state from manual driving to autonomous driving. As shown in FIG. 7, an autonomous driving device 100b in the second embodiment includes a driving state switching unit 14b in an ECU 10b. The driving state switching unit 14b switches the steering operation and the acceleration/deceleration operation to an autonomously-controlled autonomous driving operation in response to a switching request if the difference of the manual driving operation amount of each of the steering operation and the acceleration/deceleration operation performed via the manual driving operation from the autonomous driving operation amount of each of the steering operation and the acceleration/deceleration operation performed via the autonomous driving operation is equal to or smaller than the operation amount threshold that is set for each of the steering operation and the acceleration/deceleration operation.

Next, the processing performed by the autonomous driving device 100b is described. In the description below, it is assumed that the host vehicle V is traveling in the manual driving mode in which both the steering operation and the acceleration/deceleration operation are performed via the manual driving operation performed by the driver of the host vehicle V. In the description below, it is also assumed that the autonomous driving possibility determination mode of the autonomous driving device 100b is already active. The operation start condition of the autonomous driving possibility determination mode is the same as that in the first embodiment.

Figure 8:
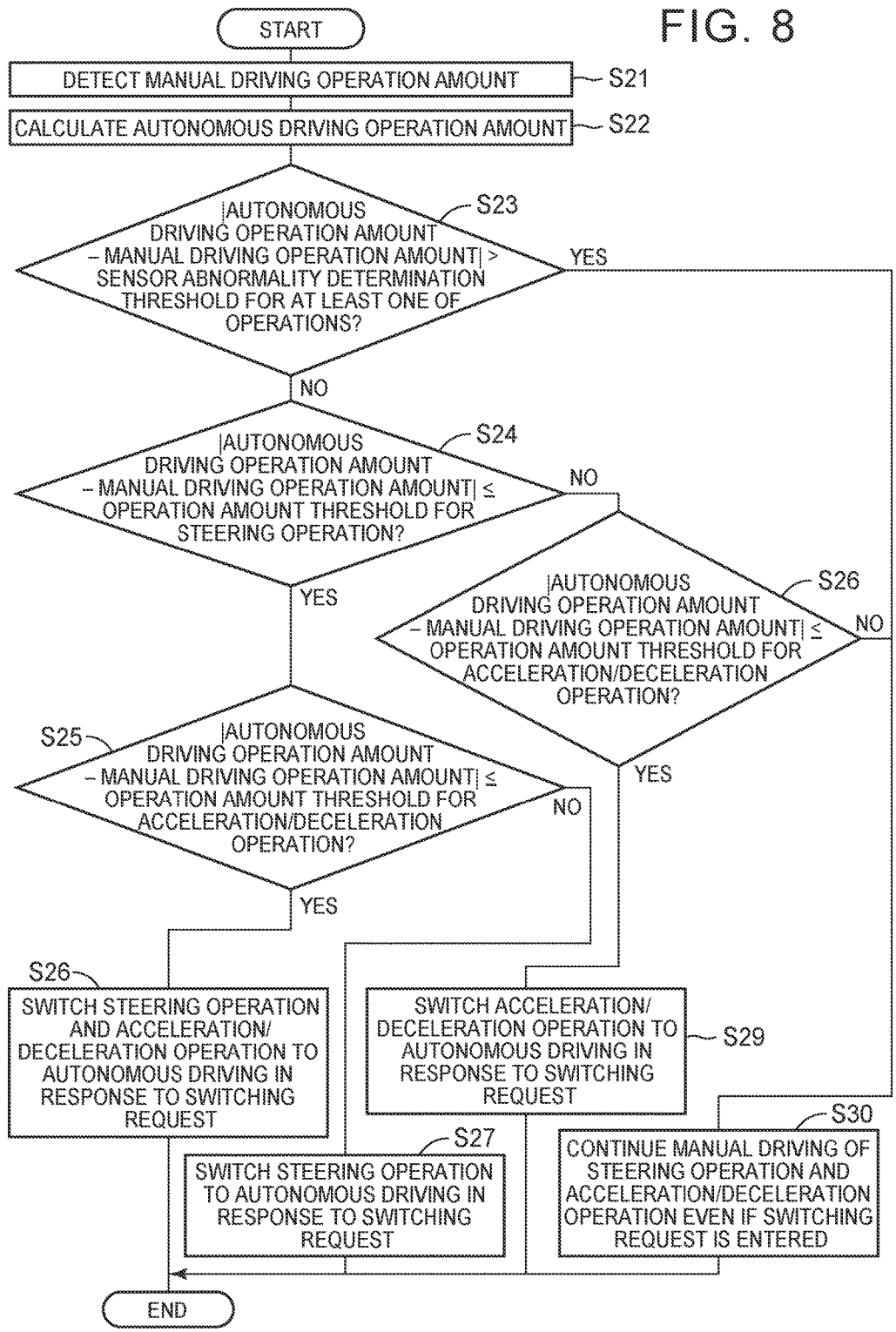
FIG. 8 is a flowchart showing the operation of the autonomous driving device shown in FIG. 7.

As shown in FIG. 8, steps S21 and S22, similar to steps S11 and S12 in the first embodiment described above, are performed. As in the first embodiment described above, the driving state switching unit 14b of the ECU 10b determines whether the difference of the manual driving operation amount of the manual driving operation from the autonomous driving operation amount of the autonomous driving operation is larger than the sensor abnormality determination threshold for at least one of the steering operation and the acceleration/deceleration operation (S23). The sensor abnormality determination threshold is set for each of the steering operation and the acceleration/deceleration operation. If the difference of the manual driving operation amount of the manual driving operation from the autonomous driving operation amount of the autonomous driving operation is not larger than the sensor abnormality determination threshold for both the steering operation and the acceleration/deceleration operation, the driving state switching unit 14b of the ECU 10b determines whether the difference of the manual driving operation amount of the steering operation performed via the manual driving operation from the autonomous driving operation amount of the steering operation performed via the autonomous driving operation is equal to or smaller than the operation amount threshold, which is set for the steering operation, as in the first embodiment described above (S24). If the difference of the manual driving operation amount from the autonomous driving operation amount is equal to or smaller than the operation amount threshold for the steering operation, the driving state switching unit 14b determines whether the difference of the manual driving operation amount of the acceleration/deceleration operation performed via the manual driving operation from the autonomous driving operation amount of the acceleration/deceleration operation performed via the autonomous driving operation is equal to or smaller than the operation amount threshold, which is set for the acceleration/deceleration operation, as in the first embodiment described above (S25).

If the difference of the manual driving operation amount of the steering operation performed via the manual driving operation from the autonomous driving operation amount of the steering operation performed via the autonomous driving operation is equal to or smaller than the operation amount threshold that is set for the steering operation and if the difference of the manual driving operation amount of the acceleration/deceleration operation performed via the manual driving operation from the autonomous driving operation amount of the acceleration/deceleration operation performed via the autonomous driving operation is equal to or smaller than the operation amount threshold that is set for the acceleration/deceleration operation, the driving state switching unit 14b notifies, via the HMI 7, the driver of the host vehicle V that the driving state may be switched to autonomous driving in response to an autonomous driving switching request entered by the driver of the host vehicle V via the HMI 7 and, after that, switches the driving state to autonomously-controlled autonomous driving for both the steering operation and the acceleration/deceleration operation (S26).

If the difference of the manual driving operation amount of the steering operation performed via the manual driving operation from the autonomous driving operation amount of the steering operation performed via the autonomous driving operation is equal to or smaller than the operation amount threshold that is set for the steering operation and if the difference of the manual driving operation amount of the acceleration/deceleration operation performed via the manual driving operation from the autonomous driving operation amount of the acceleration/deceleration operation performed via the autonomous driving operation is larger than the operation amount threshold that is set for the acceleration/deceleration operation, the driving state switching unit 14b notifies, via the HMI 7, the driver of the host vehicle V that the steering operation may be switched to autonomous driving in response to an autonomous driving switching request entered by the driver of the host vehicle V via the HMI 7 and, after that, switches the driving state to autonomously-controlled autonomous driving for the steering operation and continues manual driving for the acceleration/deceleration operation even if the switching request is entered (S27).

In step S24, if the difference of the manual driving operation amount from the autonomous driving operation amount for the steering operation is larger than the operation amount threshold, the driving state switching unit 14b determines whether the difference of the manual driving operation amount of the acceleration/deceleration operation performed via the manual driving operation from the autonomous driving operation amount of the acceleration/deceleration operation performed via the autonomous driving operation is equal to or smaller than the operation amount threshold, which is set for the acceleration/deceleration operation, as in the first embodiment described above (S28).

If the difference of the manual driving operation amount of the steering operation performed via the manual driving operation from the autonomous driving operation amount of the steering operation performed via the autonomous driving operation is larger than the operation amount threshold that is set for the steering operation and if the difference of the manual driving operation amount of the acceleration/deceleration operation performed via the manual driving operation from the autonomous driving operation amount of the acceleration/deceleration operation performed via the autonomous driving operation is equal to or smaller than the operation amount threshold that is set for the acceleration/deceleration operation, the driving state switching unit 14b notifies, via the HMI 7, the driver of the host vehicle V that the acceleration/deceleration operation may be switched to autonomous driving in response to an autonomous driving switching request entered by the driver of the host vehicle V via the HMI 7 and, after that, switches the acceleration/deceleration operation to autonomously-controlled autonomous driving and continues manual driving for the steering operation even if the switching request is entered (S29).

If the difference of the manual driving operation amount of the steering operation performed via the manual driving operation from the autonomous driving operation amount of the steering operation performed via the autonomous driving operation is larger than the operation amount threshold that is set for the steering operation and if the difference of the manual driving operation amount of the acceleration/deceleration operation performed via the manual driving operation from the autonomous driving operation amount of the acceleration/deceleration operation performed via the autonomous driving operation is larger than the operation amount threshold that is set for the acceleration/deceleration operation, the driving state switching unit 14b continues manual driving for both the steering operation and the acceleration/deceleration operation even if an autonomous driving switching request is entered by the driver of the host vehicle V via the HMI 7 (S30). In addition, in step S23, if the difference of the manual driving operation amount from the autonomous driving operation amount is larger than the sensor abnormality determination threshold for at least one of the steering operation and the acceleration/deceleration operation, the driving state switching unit 14b continues manual driving for both the steering operation and the acceleration/deceleration operation even if an autonomous driving switching request is entered (S30).

In this embodiment, if both the steering operation and the acceleration/deceleration operation of the host vehicle V are performed via the manual driving operation by the driver of the host vehicle V, the autonomous driving device 100b may perform the processing described above for only one of the steering operation and the acceleration/deceleration operation in response to an autonomous driving switching request for only one of the steering operation and the acceleration/deceleration operation entered by the driver of the host vehicle V via the HMI 7.

In this embodiment, if the steering operation of the host vehicle V is performed via the manual driving operation by the driver of the host vehicle V and the acceleration/deceleration operation of the host vehicle V is performed via the autonomously-controlled autonomous driving operation or if the acceleration/deceleration operation of the host vehicle V is performed via the manual driving operation by the driver of the host vehicle V and the steering operation of the host vehicle V is performed via the autonomously-controlled autonomous driving operation, the processing similar to that in the first embodiment is performed. In addition, in steps S26, S27, and S29 described above, if the autonomous driving possibility determination mode is already active before the driver of the host vehicle V enters an autonomous driving switching request via the HMI 7, the autonomous driving device 100b may notify the driver of the host vehicle V that the driving state may be switched to autonomous driving before a switching request is entered and, after the switching request is entered, may switch the driving state to autonomous driving.

In this embodiment, while the steering operation and the acceleration/deceleration operation of the host vehicle V are performed via the manual driving operation by the driver of the host vehicle V, the driving state switching unit 14*b* switches the driving state as follows. That is, if the difference of the manual driving operation amount of the steering operation performed via the manual driving operation from the autonomous driving operation amount of the steering operation performed via the autonomous driving operation is equal to or smaller than the operation amount threshold that is set for the steering operation, the driving state switching unit 14*b* switches the steering operation to the autonomously-controlled autonomous driving operation in response to a switching request. In addition, if the difference of the manual driving operation amount of the acceleration/deceleration operation performed via the manual driving operation from the autonomous driving operation amount of the acceleration/deceleration operation performed via the autonomous driving operation is equal to or smaller than the operation amount threshold that is set for the acceleration/deceleration operation, the driving state switching unit 14*b* switches the acceleration/deceleration operation to the autonomously-controlled autonomous driving operation in response to a switching request. Therefore, for each of the steering operation and the acceleration/deceleration operation, if the manual driving operation differs much from the autonomous driving operation with a high possibility that the autonomous driving operation suitable for the actual traveling environment will not be performed, the autonomous driving device 100*b* can prevent the driving state from being switched from manual driving to autonomous driving. On the other hand, if the manual driving operation differs less from the autonomous driving operation with a high possibility that the autonomous driving operation suitable for the actual traveling environment will be performed, the autonomous driving device 100*b* can switch the driving state from manual driving to autonomous driving.

While the embodiments of the present invention have been described above, it is to be understood that the present invention is not limited to the specific embodiments described above but may be implemented in a variety of modes.

What is claimed is:

1. An autonomous driving device configured to switch a driving state of a host vehicle from manual driving to autonomous driving, the autonomous driving device comprising:
    an HMI comprising any one of a display panel, a microphone, an operation button, a touch panel, and a mobile information terminal, configured to allow a driver of the host vehicle to request that the driving state of the host vehicle be changed from the manual driving to the autonomous driving;
    a manual driving operation amount detection portion configured to detect, during the manual driving, a manual driving operation amount of a manual driving operation performed by a driver of the host vehicle, wherein the manual driving operation amount is at least one of: (i) a steering angle or torque corresponding to a steering wheel on the vehicle, (ii) an acceleration throttle angle corresponding to an acceleration pedal on the vehicle, and (iii) a brake force corresponding to a brake pedal on the vehicle;
    an autonomous driving operation amount calculation portion configured to calculate, during the manual driving, an autonomous driving operation amount of an autonomously-controlled autonomous driving operation based on a traveling environment of the host vehicle assuming that the driving state were to be switched from the manual driving to the autonomous driving, wherein the autonomous driving operation amount corresponds to the manual driving operation amount; and
    a driving state switching portion configured to determine whether a difference between the manual driving operation amount and the autonomous driving operation amount is equal to or smaller than an operation amount threshold, and based upon the difference being lower than the operation amount threshold, to switch, during the manual driving, the driving state from the manual driving to the autonomous driving in response to the request by the driver of the host vehicle to switch to the autonomous driving.

2. The autonomous driving device according to claim 1, wherein
    the manual driving operation amount detection portion determines each of a steering operation and an acceleration/deceleration operation performed via the manual driving operation by the driver of the host vehicle based on the detected manual driving operation amount during the manual driving,
    the autonomous driving operation amount calculation portion determines each of the steering operation and the acceleration/deceleration operation performed via the autonomous driving operation by the host vehicle assuming that each of the steering operation and the acceleration/deceleration operation was being performed via the autonomously-controlled autonomous driving operation, and
    the driving state switching portion switches the steering operation to the autonomously-controlled autonomous driving operation in response to the switching request if the difference between the manual driving operation amount of the steering operation performed via the manual driving operation and the autonomous driving operation amount of the steering operation performed via the autonomous driving operation is equal to or smaller than the operation amount threshold that is set for the steering operation, and switches the acceleration/deceleration operation to the autonomously-controlled autonomous driving operation in response to the switching request if the difference between the manual driving operation amount of the acceleration/deceleration operation performed via the manual driving operation and the autonomous driving operation amount of the acceleration/deceleration operation performed via the autonomous driving operation is equal to or smaller than the operation amount threshold that is set for the acceleration/deceleration operation.

3. A vehicle control device that can control a driving state of a vehicle by switching the driving state from manual driving to autonomous driving, the vehicle control device comprising:
    an external sensor that detects an external environment of the vehicle;
    an internal sensor that detects information indicating a traveling state of the vehicle and a manual driving operation amount performed by a driver, wherein the manual driving operation amount is at least one of: (i) a steering angle or torque corresponding to a steering wheel on the vehicle, (ii) an acceleration throttle angle corresponding to an acceleration pedal on the vehicle, and (iii) a brake force corresponding to a brake pedal on the vehicle;

an actuator that performs traveling control of the vehicle; and an ECU configured to:

receive an input request by a driver via an HMI during the manual driving, wherein the HMI is one of a display panel, a microphone, an operation button, a touch panel, and a mobile information terminal;

calculate, based on the detected external environment of the vehicle, an autonomous driving operation amount to be operated if the driving state were to be switched to the autonomous driving, wherein the autonomous driving operation amount corresponds to the manual driving operation amount;

compare a difference between the detected manual operation amount and the calculated autonomous driving operation amount with an operation amount threshold to determine whether it is possible to switch the driving state of the vehicle from the manual driving to the autonomous driving; and based upon the difference being equal to or lower than the operation amount threshold, control the vehicle to switch from the manual driving to the autonomous driving.

4. A method for switching a driving state of a vehicle from a manual driving to an autonomous driving comprising:

receiving an input request by a driver via a human machine interface (HMI) during the manual driving, wherein the HMI is one of a display panel, a microphone, an operation button, a touch panel, and a mobile information terminal;

detecting, in response to the received input, a manual operation amount during the manual driving, wherein the manual driving operation amount is at least one of: (i) a steering angle or torque corresponding to a steering wheel on the vehicle, (ii) an acceleration throttle angle corresponding to an acceleration pedal on the vehicle, and (iii) a brake force corresponding to a brake pedal on the vehicle;

calculating, based on a detected environment of the vehicle, an autonomous driving operation amount to be operated if the driving state were to be switched to the autonomous driving, wherein the autonomous driving operation amount corresponds to the manual driving operation amount;

comparing a difference between the detected manual operation amount and the calculated autonomous driving operation amount with an operation amount threshold to determine whether it is possible to switch the driving state of the vehicle from the manual driving to the autonomous driving; and controlling the vehicle to start the autonomous driving based upon the difference being equal to or lower than the operation amount threshold.

5. The method for switching the driving state of the vehicle according to claim 4, wherein before starting the autonomous driving, issuing a notification to the driver that the autonomous driving will be started.

6. The method for switching the driving state of the vehicle according to claim 4, wherein after the state in which the difference of the manual driving operation amount and the autonomous driving operation amount is determined to be equal to or smaller than the operation amount threshold continues for a predetermined time, the autonomous driving is started.

7. A method for switching a driving state of a vehicle from a manual driving to an autonomous driving, comprising:

detecting a manual operation amount during the manual driving, wherein the manual driving operation amount is at least one of: (i) a steering angle or torque corresponding to a steering wheel on the vehicle, (ii) an acceleration throttle angle corresponding to an acceleration pedal on the vehicle, and (iii) a brake force corresponding to a brake pedal on the vehicle;

calculating, based on a detected environment of the vehicle, an autonomous driving operation amount to be operated if the driving state were to be switched to the autonomous driving, wherein the autonomous driving operation amount corresponds to the manual driving operation amount;

comparing a difference between the detected manual operation amount and the calculated autonomous driving operation amount with an operation amount threshold to determine whether it is possible to switch the driving state of the vehicle from the manual driving to the autonomous driving;

receiving an input request by a driver via a human machine interface (HMI) during the manual driving, wherein the HMI is one of a display panel, a microphone, an operation button, a touch panel, and a mobile information terminal;

in response to the received input and the determination that the difference is equal to or lower than the operation amount threshold, controlling the vehicle to start the autonomous driving.

* * * * *